United States Patent
Feng et al.

(10) Patent No.: US 10,942,316 B1
(45) Date of Patent: Mar. 9, 2021

(54) FAU CONNECTORS AND ASSEMBLIES EMPLOYING PIN-TO-PIN ALIGNMENT

(71) Applicant: ALLIANCE FIBER OPTIC PRODUCTS, INC., Sunnyvale, CA (US)

(72) Inventors: Ximao Feng, San Mateo, CA (US); Shudong Xiao, Fremont, CA (US); Andy Fenglei Zhou, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 16/669,746

(22) Filed: Oct. 31, 2019

(51) Int. Cl.
*G02B 6/36* (2006.01)
*G02B 6/38* (2006.01)

(52) U.S. Cl.
CPC ......... *G02B 6/3839* (2013.01); *G02B 6/3809* (2013.01); *G02B 6/3874* (2013.01)

(58) Field of Classification Search
CPC ... G02B 6/3839; G02B 6/3809; G02B 6/3874
See application file for complete search history.

(56) References Cited

U.S. PATENT DOCUMENTS

| | | | | |
|---|---|---|---|---|
| 5,500,914 A * | 3/1996 | Foley | ............... | G02B 6/3865 385/31 |
| 5,764,840 A * | 6/1998 | Wach | ............... | G02B 6/04 385/123 |
| 5,778,123 A * | 7/1998 | Hagan | ............... | G02B 6/3885 385/76 |
| 6,243,518 B1 | 6/2001 | Lee et al. | | |
| 6,474,877 B1 | 11/2002 | Shahid | | |
| 8,961,034 B2 * | 2/2015 | Li | ............... | G02B 6/3858 385/65 |
| 10,215,926 B2 * | 2/2019 | Ott | ............... | G02B 6/3885 |
| 2004/0042731 A1 | 3/2004 | Hall | | |
| 2012/0257860 A1 * | 10/2012 | Li | ............... | G02B 6/3885 385/83 |
| 2013/0266268 A1 * | 10/2013 | Li | ............... | G02B 6/3882 385/81 |
| 2014/0010498 A1 * | 1/2014 | Verslegers | ............... | G02B 6/30 385/37 |
| 2014/0321809 A1 | 10/2014 | Bowen et al. | | |
| 2016/0274318 A1 * | 9/2016 | Vallance | ............... | G02B 6/4214 |

* cited by examiner

*Primary Examiner* — Ellen E Kim
(74) *Attorney, Agent, or Firm* — Grant A. Gildehaus

(57) ABSTRACT

A fiber array unit (FAU) connector includes a support substrate having a rear-end section and an elevated front-end section. The front-end section has a top surface with fiber grooves that support bare glass sections of optical fibers, which have respective fiber end faces that reside at a front end face defined by the front-end section. Two alignment pins reside in parallel alignment pin channels on opposite sides of the fiber grooves. The alignment pin channels terminate at respective front-end recessed surfaces that are axially spaced from the front end face. The alignment pins extend from the alignment pin channels to be even with the front end face. A cover secured to the front-end section holds the bare glass sections of the optical fibers and the alignment pins in place. Alignment sleeves are used to establish pin-to-pin alignment of confronting FAU connectors.

20 Claims, 13 Drawing Sheets

FAU CONNECTORS AND ASSEMBLIES EMPLOYING PIN-TO-PIN ALIGNMENT

FIELD

The present disclosure relates generally to optical fibers and fiber array units (FAUs), and in particular relates to FAU connectors and assemblies designed for pin-to-pin alignment.

TECHNICAL BACKGROUND

Optical fiber interconnection devices (e.g., optical fiber connectors) are used in a variety of telecommunication and optical device applications to place optical fibers in optical communication with other optical fibers or with other optical devices, such as optical transmitters and optical receivers of a photonic integrated circuit (PIC). For example, fiber array units (FAUs) are typically used in optical interconnections to support and align arrays of optical fibers and to define an end face where optical communication can occur between the optical fibers of the FAU and waveguides or components of another optical device.

It is often desirable to have a high fiber density at the end faces of FAUs to maximize data transmission capacity (bandwidth density). This places greater demands on alignment tolerances of the optical fibers supported by the FAU, and makes it more difficult to achieve acceptable coupling efficiency for the associated optical interconnection.

In addition, certain types of FAUs need to be compatible with PIC-related assembly processes, including high-temperature processes used for solder reflow, where temperatures can rise to about 260° C. for between about 15 to 45 seconds.

It is also desirable to have FAUs formed using precision components and features—including some that already exist in the industry—so that no one component or feature can cause the optical fibers of the FAU to exceed the required alignment tolerances.

SUMMARY

An embodiment of the disclosure is directed to an FAU connector configured for pin-to-pin alignment, comprising: an array of optical fibers, with each optical fiber of the array of optical fibers having a coated section and a bare glass section that includes a fiber end face; and a support substrate supporting the array of optical fibers, the support substrate having a substrate central axis, a rear-end section, and a front-end section that is elevated relative to the rear-end section. The front-end section includes a front end face that resides in a front end face plane, front-end recessed surfaces that are axially spaced apart from the front end face, and a top surface with fiber grooves that are substantially parallel to the substrate central axis and that respectively support the bare glass sections of the optical fibers so that the fiber end faces reside adjacent to the front end face. The front-end section further includes first and second alignment pin channels that run substantially parallel to the substrate central axis, that reside on opposite sides of the fiber grooves, and that terminate at a respective one of the front-end recessed surfaces. The rear-end section supports the coated sections of the optical fibers. The FAU connector also comprises first and second alignment pins respectively supported in the first and second alignment pin channels, with each of the first and second alignment pins axially extending from their respective first or second alignment pin channels by an extension distance dE; and a cover secured to the front-end section to hold the bare glass sections and the first and second alignment pins in place.

Another embodiment of the disclosure is directed to an FAU connector assembly employing pin-to-pin alignment, where each alignment pin has a front-end section with a front end, comprising: first and second FAU connectors as summarized above and as disclosed in detail herein; first and second alignment sleeves each having first and second opposite ends and an interior; and wherein the front-end sections of the first and second alignment pins of the first and second FAU connectors respectively reside in the interiors of the first and second alignment sleeves so that the front ends of the first alignment pins are confronting in the first alignment sleeve and the front ends of the second alignment pins are confronting in the second alignment sleeve, thereby placing the end faces of the optical fibers of the first and second FAU connectors in optical alignment.

Another embodiment of the disclosure is directed to an optical assembly, comprising: an FAU connector as summarized above and as disclosed in detail herein; a fiber ribbon cable having a first cable end terminated by the FAU connector, wherein the fiber ribbon cable carries the optical fibers of the FAU connector and has a second cable end opposite the first cable end; and a photonic integrated circuit (PIC) FAU connecter that terminates the second cable end; and a PIC module optically connected to the PIC FAU connector.

Another embodiment of the disclosure is directed to an FAU connector, comprising: an array of optical fibers, with each optical fiber of the array of optical fibers having a coated section and a bare glass section that includes a fiber end face; a support substrate supporting the array of optical fibers and having a monolithic substrate body with a substrate central axis, the support substrate including: i) a rear-end section that defines a rear end and a rear-end top surface, and ii) a front-end section that defines a front end face, first and second front-end recessed surfaces axially spaced apart from the front end face, and a front-end top surface elevated relative to the rear-end top surface, wherein: the front-end section includes a central protrusion that extends in the direction of the substrate central axis, the first and second front-end recessed surfaces are axially separated from the front end face by a protrusion distance dF, the front-end top surface includes fiber grooves, and the coated sections of the optical fibers are supported on the rear-end top surface and the bare glass sections are supported in the fiber grooves in the front-end top surface such that the fiber end faces reside adjacent to the front end face; first and second alignment pin channels each formed in the front-end top surface and the rear-end top surface, wherein the first and second alignment pin channels run substantially parallel to the substrate central axis on opposites sides thereof and have open ends at the respective first and second front-end recessed surfaces; first and second alignment pins respectively disposed in the first and second alignment pin channels, wherein each of the first and second alignment pins includes a front-end section that extends past the respective first or second front-end recessed surface by an extension distance dE that is less than the protrusion distance dF; and a cover secured to the front-end section of the support substrate, the cover having a front end, a bottom surface, and cover alignment pin channels in the bottom surface, wherein the cover is disposed on the front-end section such that the bottom surface resides on the bare glass sections of the optical fibers, the cover alignment pin channels receive and engage portions of the first and second alignment pins, and the cover end face resides adjacent to the front end face of the support substrate. The FAU connector can further comprise first and second alignment sleeves each having opposite first and second ends and an interior, wherein the front-end sections of the first and second alignment pins respectively reside within the interiors of the first and second alignment sleeves at the first ends of the first and second alignment sleeves.

Additional features and advantages will be set forth in the detailed description which follows, and in part will be apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description explain the principles and operation of the various embodiments.

DETAILED DESCRIPTION

The claims set out below are incorporated by reference into this Detailed Description section.

Cartesian coordinates are shown in some of the Figures for local reference and ease of explanation and are not intended to be limiting as to direction or orientation.

Terms like front, back, top, bottom, side, etc. are relative terms used for convenience and ease of explanation and are not intended to be limiting.

The abbreviation μm stands for "micron" or "micrometer," while the abbreviation nm stands for nanometer.

The terms "optical fiber interconnect device," "optical interconnect device," "optical fiber interconnection device," "optical interconnection device," "optical fiber connector," "fiber connector," and "connector" are used synonymously in this disclosure and describe a device that facilitates optical communication between one or more first optical fibers and one or more second optical components in another device. Example optical components include optical fibers, optical waveguides, light sources, light receivers, transceivers, passive optical elements, active optical elements, etc.

The term "fiber array unit" or "FAU" in this disclosure means a plurality of optical fibers arranged and securely maintained in an array on a substrate.

The terms "FAU fiber connector," and "FAU connector" are used synonymously in this disclosure and mean a fiber connector that employs an FAU.

Figure 5A:
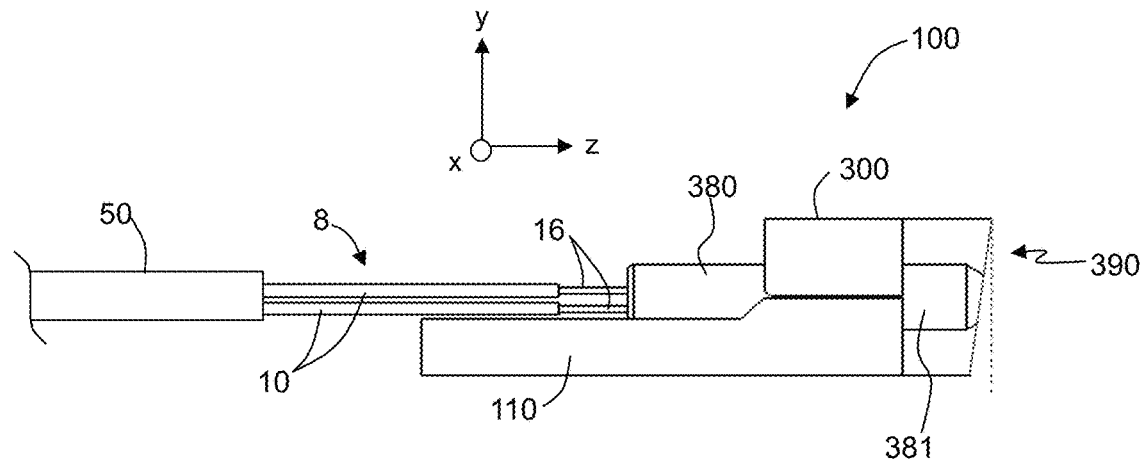
FIG. 5A is a side view of an example FAU connector that includes an angled FAU end face, where the angle is in the y-z plane.
Figure 5B:
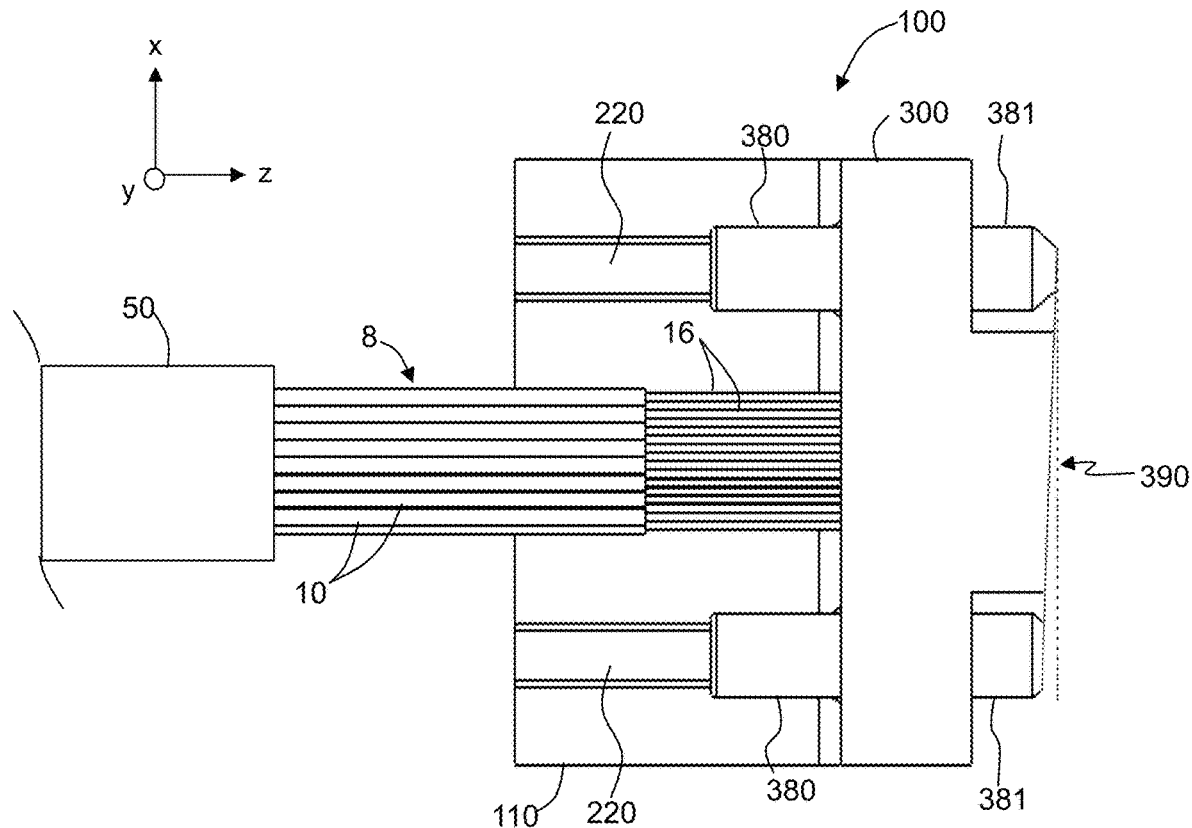
FIG. 5B is a side view of an example FAU connector that includes an angled FAU end face, where the angle is in the x-z plane.

The term "substantially parallel" as used in reference to the various end faces and surfaces in this disclosure includes cases where there are slight angular differences between the surfaces in question, such as for example when surfaces are not perfectly parallel due to manufacturing limitations and tolerances (see, e.g., FIGS. 5A and 5B).

The term "substantially similar" as used in reference to material properties in this disclosure, such as coefficient of the thermal expansion, refers to there being less than 2% difference between the material property values being compared.

Example Optical Fibers

Figure 1A:
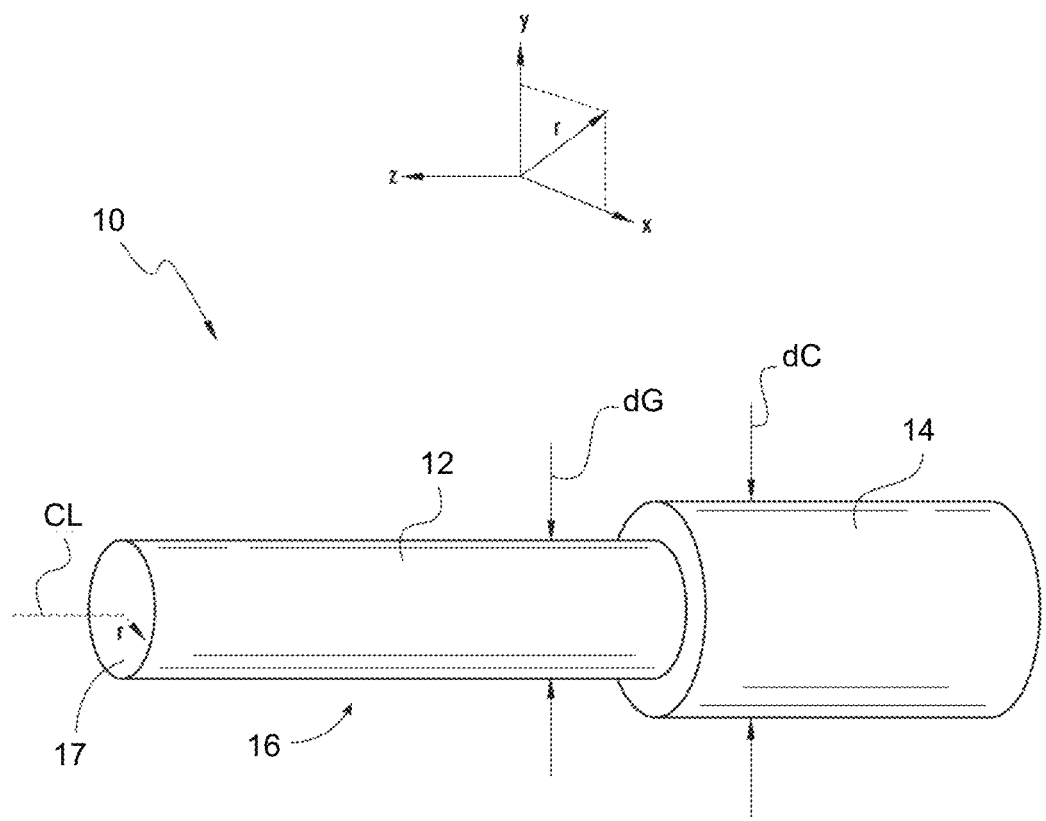
FIG. 1A is a schematic elevated view of an example optical fiber ("fiber") showing an exposed (bare) glass end section and a non-glass protective coating section surrounding the remaining portion of the glass section.
Figure 1B:
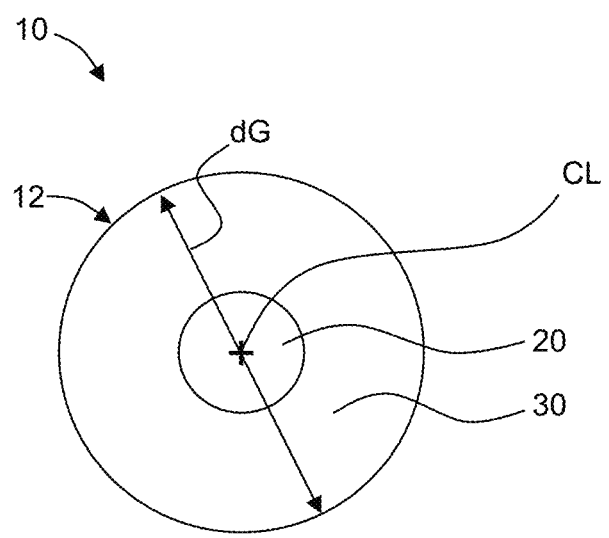
FIG. 1B is a cross-sectional view of the glass end section of the optical fiber of FIG. 1A showing a central glass core and a surrounding glass cladding.

FIG. 1A is a schematic elevated view of an example optical fiber ("fiber") 10 supported by the FAU-based optical fiber interconnection device ("FAU connector") described below. FIG. 1B is a cross-sectional or end-on view of the fiber 10. The fiber 10 of FIG. 1 has a glass section 12 with a diameter dG and a non-glass protective coating section 14 (also referred to as "coated section 14") with a diameter dC surrounding the glass section 12. The fiber 10 has a centerline CL that runs in the z-direction of the local Cartesian coordinates shown in FIG. 1A. A radial polar coordinate r extends perpendicular to the z-axis. The fiber 10 is assumed to be circularly symmetric about the z-axis (and thus the centerline CL) so that the angular polar coordinate is not needed. The fiber 10 of FIG. 1 has an end section 16 with an end face 17. The end section 16 has the coating section 14 removed and so can also be referred to as a "bare section," "bare glass section," "stripped section," or "glass end section."

FIG. 1B shows the glass section 12 as comprising a core 20 centered on the centerline CL, and a cladding 30 surrounding the core 20. The cladding 30 can comprise a single region or two or more regions with different refractive indices (e.g., different relative refractive index values or profiles). In an example, the fiber 10 has a reduced fiber diameter, e.g., a reduced cladding diameter and a reduced coating diameter (as compared to standard fibers), low attenuation, low bend losses, a G.657-compliant mode field diameter, and a low cutoff wavelength. Such fibers are described for example in U.S. Provisional Patent Application No. 62/726,664, entitled "small diameter low attenuation optical fiber," filed on Sep. 4, 2018, and which is incorporated by reference herein. In an example, the fiber 10 is a single mode fiber.

In an example, the design of the refractive index profile of the cladding 30 of the fiber 10 may include a refractive index trench (not shown) that diminishes the sensitivity of the coated fiber to bending. The coating section 14 can employ a primary coating and/or secondary coating with reduced thickness relative to commercially available fibers. The thinner coating thickness of the coating section 14 provides compact coated fibers that can be densely packed and/or readily installed in existing fiber infrastructures. The mechanical properties of the primary coating are selected such that good microbending performance of the coated fiber is achieved, even when the thickness of the primary coating is reduced. The mechanical properties of the secondary coating are selected such that good puncture resistance of the coated fiber is achieved, even when the thickness of the secondary coating is reduced.

In an example, the fiber 10 is a reduced cladding fiber wherein the diameter dG of the glass section 12 is less than or equal to 80 microns, or even less than or equal to 65 microns, e.g. in the range between 40 to 80 microns or 40 to 60 microns. In another example, the fiber 10 is a conventional single mode fiber having a diameter dG for example of 125 microns.

Fiber Array Unit (FAU)

Figure 2:
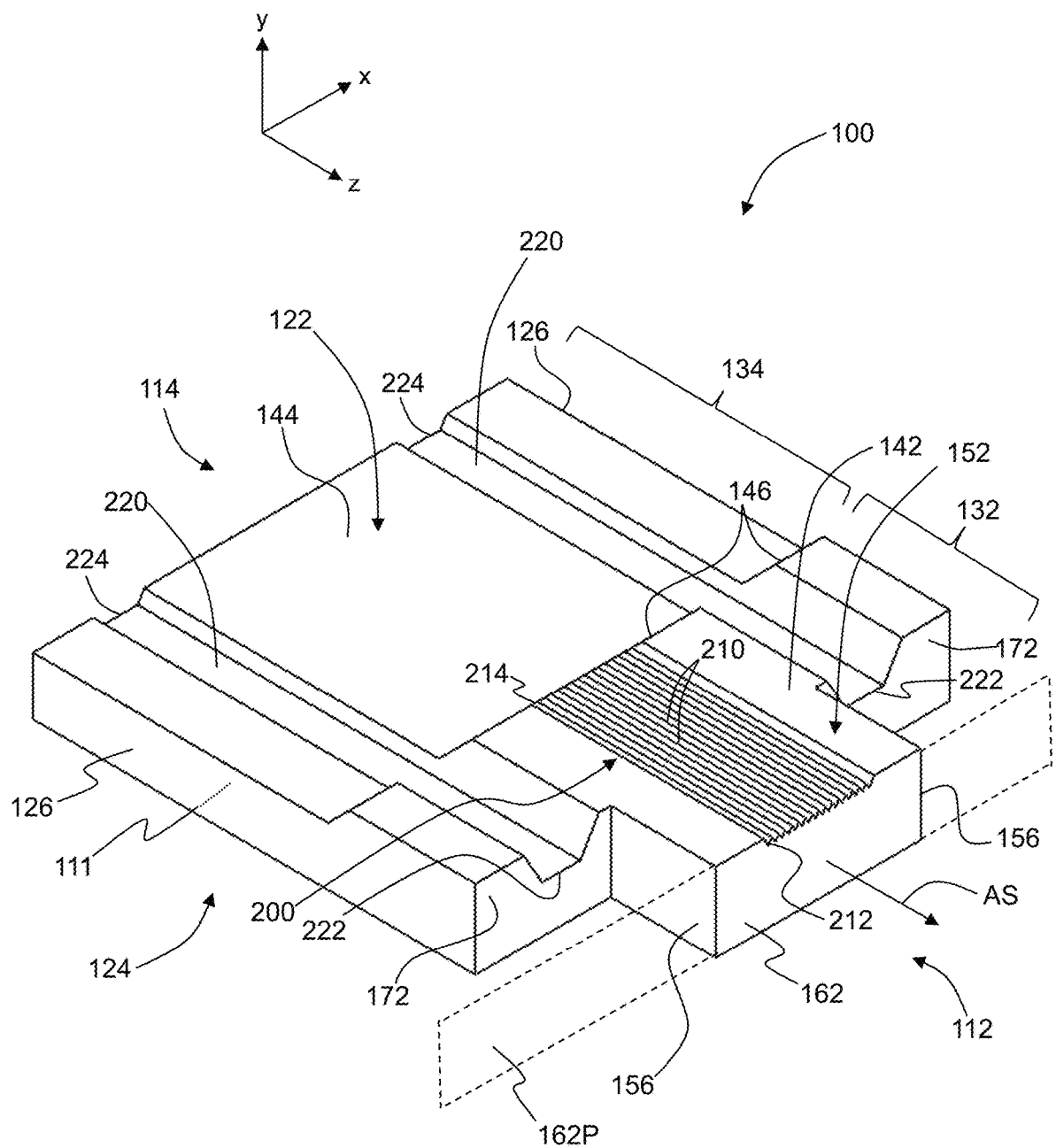
FIG. 2 is a front elevated view of an example FAU support substrate.

FIG. 2 is a front elevated view of an example FAU support substrate ("support substrate") 110 used to form an FAU connector according to this disclosure. The support substrate 110 has a substrate body 111, which has substrate central axis AS that runs through the middle of the substrate body 111 in the z-direction of the local Cartesian coordinates shown in FIG. 2A. The support substrate 110 has a generally rectangular shape and also has a number of precision-formed features, which are described in detail below.

The support substrate 110 has a first or "front" end 112, a second or "rear" end 114, a first or "top" side 122, a second or "back" side 124, and opposite side edges 126. In an example, the support substrate 110 is formed as a unitary or monolithic structure made of a single material. Example materials for forming the support substrate 110 include glass (e.g., silica glass), silicon, ceramics, and glass ceramics. The precision-formed features of the support substrate 110 can be formed using one or more of a number of known processes, such as micromachining, laser processing, glass drawing techniques, and photolithographic techniques, with the particular process or processes used depending on the particular material used to form the support substrate.

The support substrate 110 has a first-end or "front-end" section 132 that includes the front end 112. The front-end section 132 also has a front-section surface 142 on the top side 122. The support substrate 110 also includes a second-end or "rear-end" section 134 that includes the rear end 114. The rear-end section 134 also has rear-section surface 144 on the top side 122. The front-section surface 142 is elevated relative to the rear-section surface 144 and these two surfaces are connected by a transition region 146, which in the example shown is linearly sloped surface section. The front-section surface 142 and the rear-section surface 144 are substantially planar and are parallel.

Figure 4A:
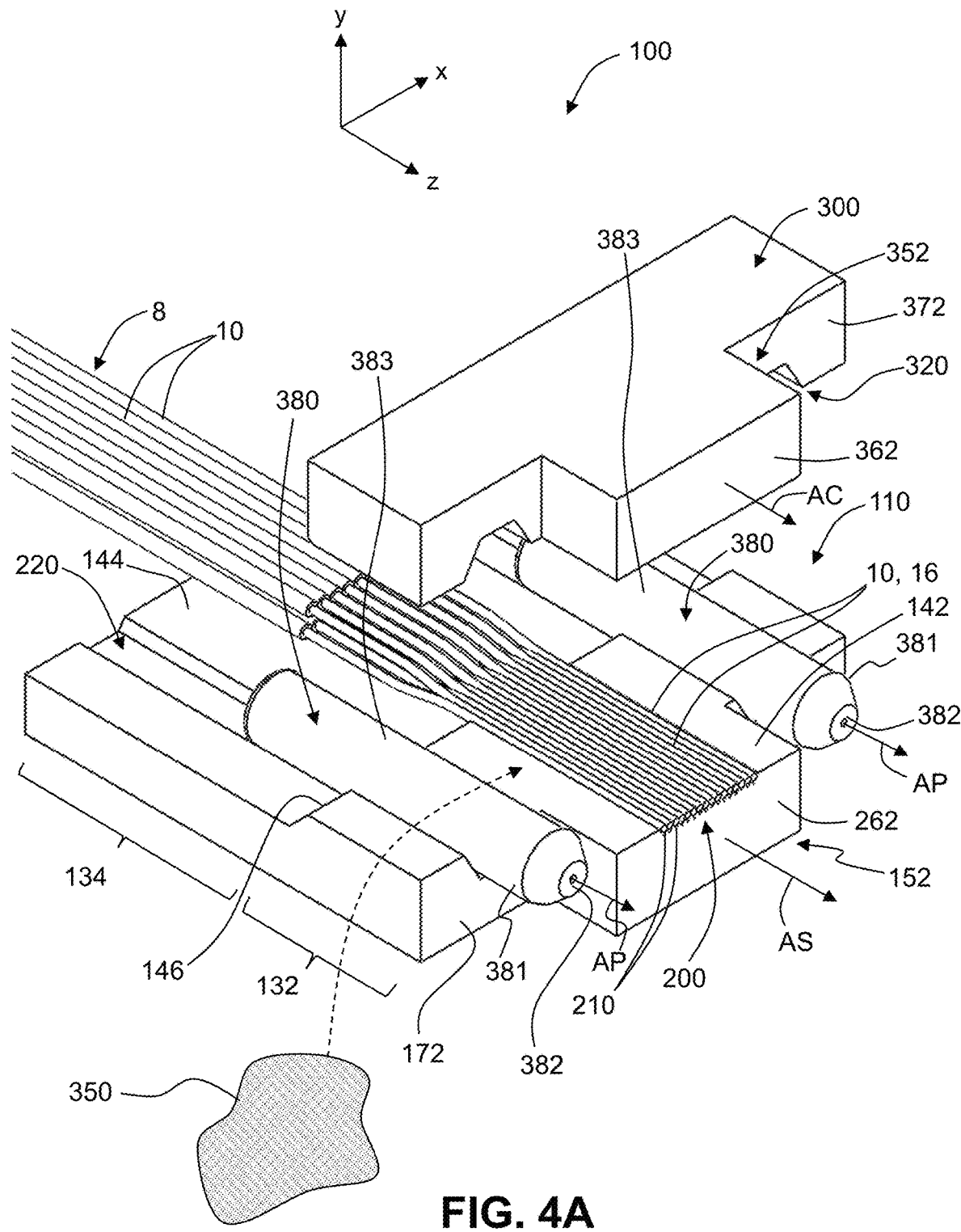
FIG. 4A shows the FAU support substrate supporting an array of optical fibers ("fiber array") and two alignment pins that reside on opposite sides of the fiber array, with the cover residing above the FAU support substrate and ready to be put into place to form an example of an FAU connector according to this disclosure.
Figure 4B:
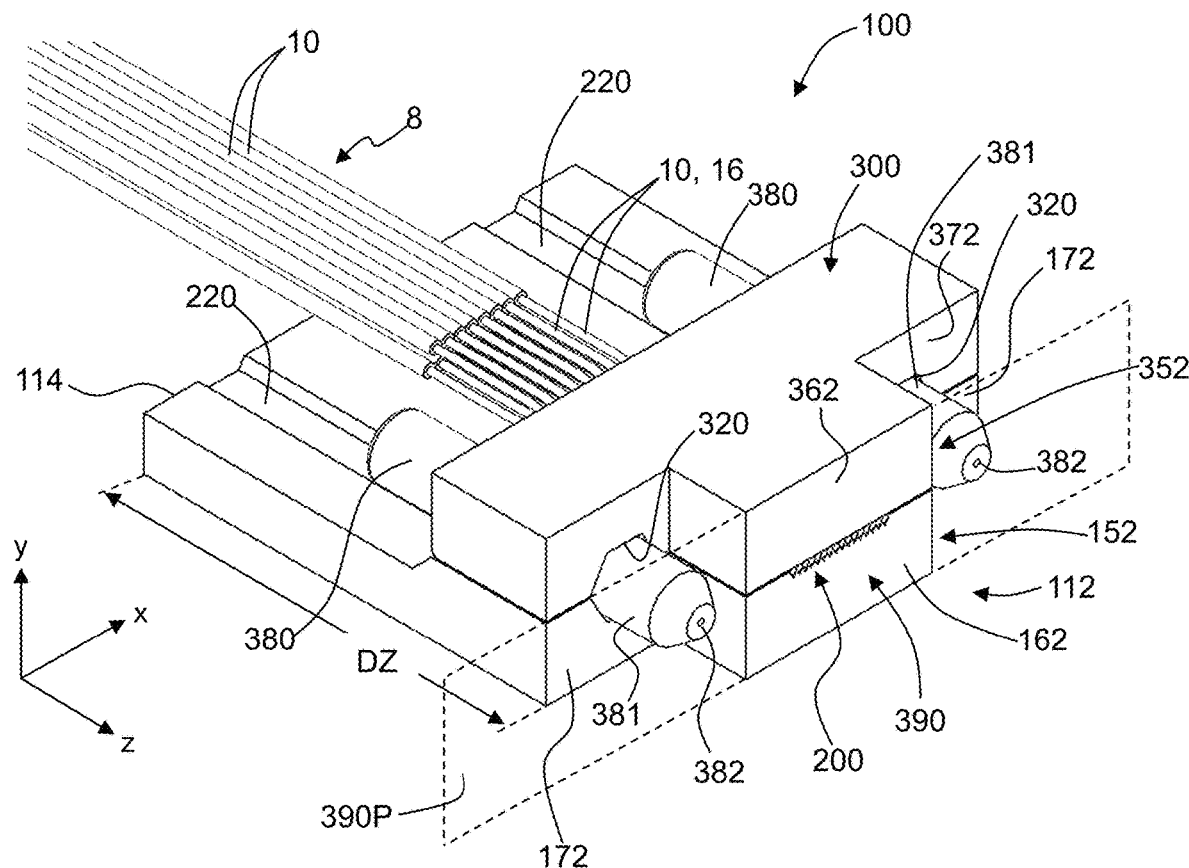
FIG. 4B is similar to FIG. 4A, but shows the cover in place on a front-end section of the FAU support substrate to hold the optical fibers in place to form the example FAU connector.
Figure 4C:
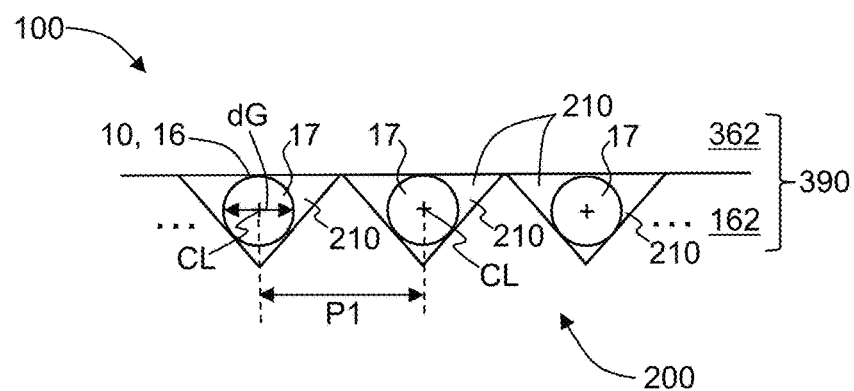
FIG. 4C is a close-up, front-end view of the FAU connector showing an example of the optical fibers residing in fiber grooves in the front-end section of the FAU support substrate, with the fiber grooves defining a fiber pitch P1.
Figure 4D:
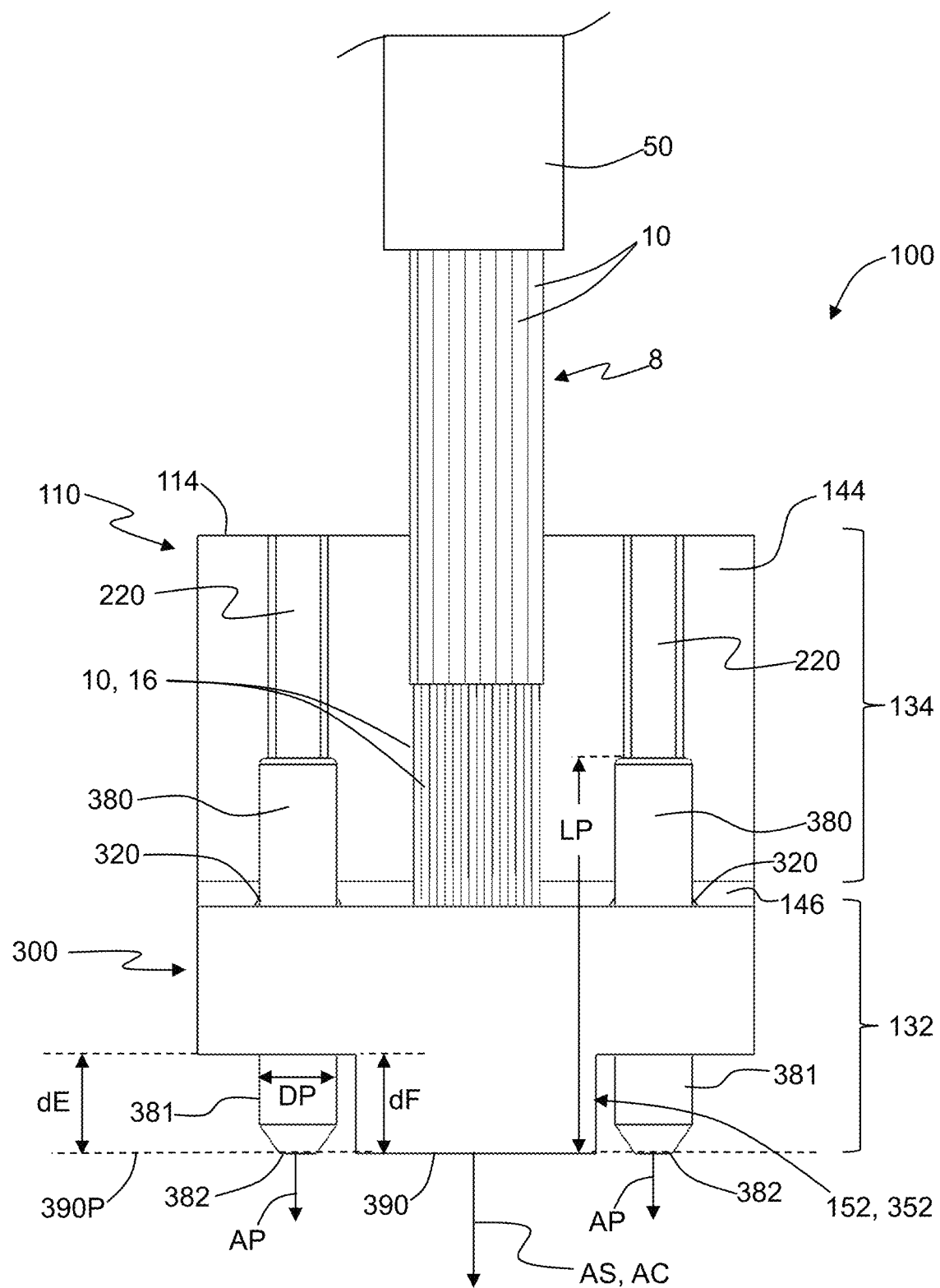
FIG. 4D is a top-down view of the example FAU connector of FIG. 4B.

The front-end section 132 includes a central protrusion 152 that extends in the z-direction beyond the rest of the front-end section 132 by a protrusion distance dF (see FIG. 4D). The central protrusion 152 is rectangular and includes a planar front end face 162 (also referred to as "support substrate end face 162") that defines a front end face plane 162P that in an example is parallel to the x-y plane. The substrate body 111 includes front-end recessed surfaces 172 in the front-end section 132 on respective sides of the central protrusion 152, i.e., the front-end recessed surfaces 172 are set back from the front end face 162 in the −z direction (and, in the example shown, parallel to the front end face 162). Thus, the distance dF is the distance from the plane defined by the front-end recessed surfaces 172 to the front end face 162. In an example, the central protrusion 152 has a rectangular shape With continuing reference to FIG. 2, the front-section surface 142 includes an array 200 of fiber support grooves ("fiber grooves") 210 and that run parallel to the substrate central axis AS from the transition region 146 to the front end face 162. In an example, the fiber grooves 210 have a V-shape. Other shapes, such as U-shaped or squared off, can also be employed. The fiber grooves 210 are sized to accommodate respective bare end sections 16 of the fibers 10, as described below. Each fiber groove 210 has a front end 212 that is open at the front end face 162 of the central protrusion 152, and a rear end 216 that is open at the transition region 146.

The support substrate 110 also includes two alignment pin support channels ("substrate pin channels") 220 formed on the top side 112 in the front-section surface 142 and the rear-section surface 144, as well as in the transition region 146. The substrate pin channels 220 are located on respective sides of the substrate central axis AS, are parallel to the substrate central axis AS, are adjacent the respective side edges 126, and run from the rear end 114 to the front-end recessed surfaces 172 of the support substrate 110. Each substrate pin channel 220 has a front end 222 open at the corresponding front-end recessed surface 172, and has a back end 224 open at the rear end 114 of the support substrate 110. Note that the substrate pin channels 220 are open channels and are deeper in the front-end section 132 due to the front-section surface 142 being elevated relative to the rear-section surface 144. In an example, the substrate pin channels 220 need not run all the way to the rear end 114 and can terminate within the rear-end section 134 or even within the front-end section 132. The cross-sectional shape of the substrate pin channels 220 can be any reasonable shape, included the angular/multi-faceted shape (see FIG. 2) or can be rounded, V-shaped, etc.

The substrate pin channels 220 are formed at a known and precise distance from the array 200 of fiber grooves 210 so that the alignment of alignment pins 380 (see FIG. 4A) of two different FAU connectors (as described below) places the corresponding end faces 17 of the fibers 10 of the two different FAU connectors in substantial optical alignment. This is what is meant by the phrase "pin-to-pin alignment" between two different FAU connectors in this disclosure.

Figure 3A:
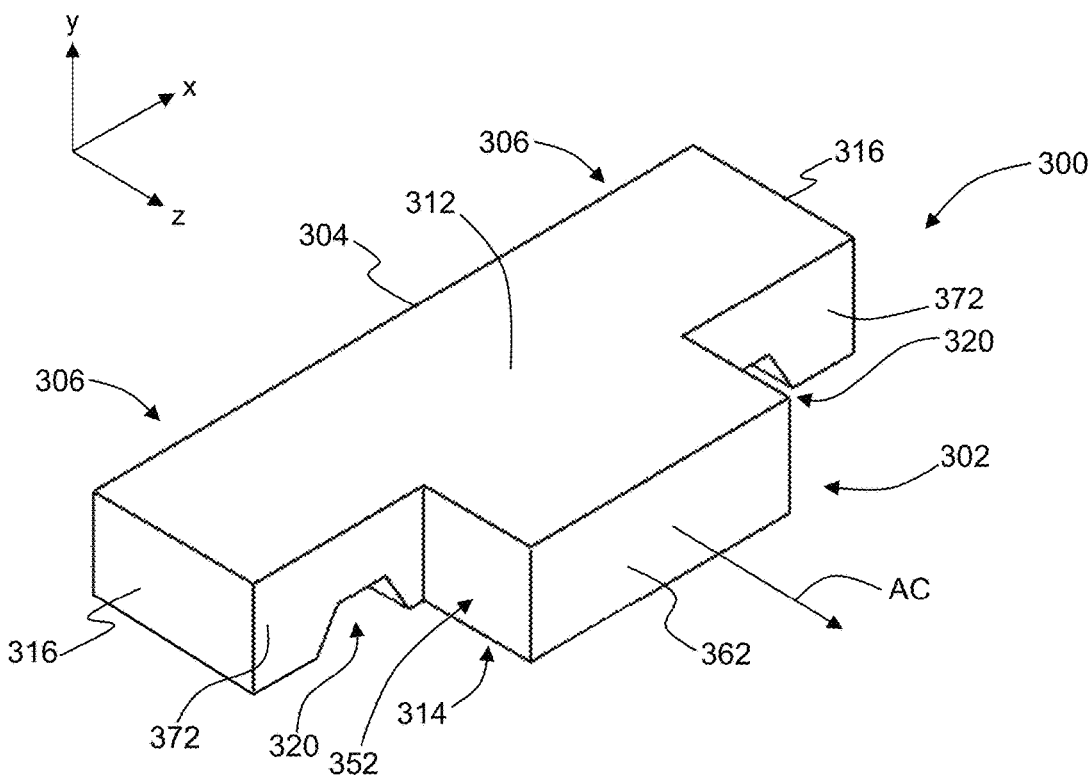
FIGS. 3A and 3B are top-down and bottom-up views of an example cover that can be used on the FAU support substrate to form a FAU-based fiber connector ("FAU connector") according to this disclosure.
Figure 3B:
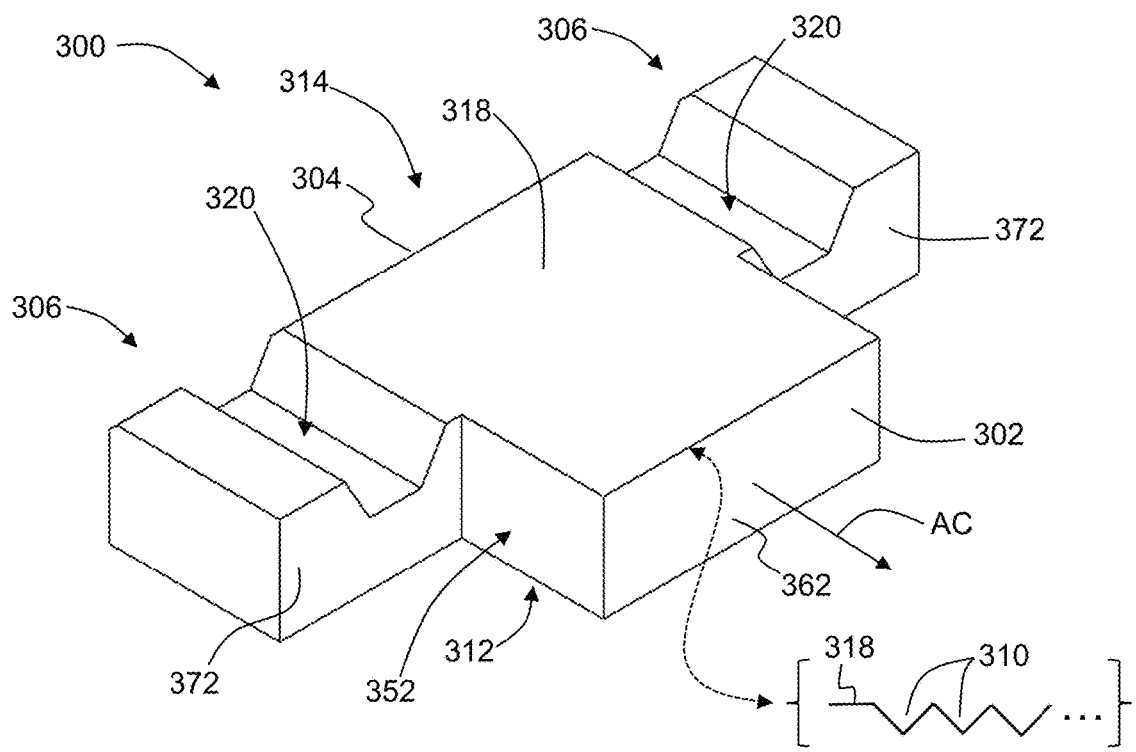

FIGS. 3A and 3B are top-down and bottom-up elevated views, respectively, of an example cover 300 used to form the FAU connector as described below. The cover 300 includes a cover axis AC that runs in the local z-direction. The cover 300 includes a front end 302, a rear end 304, a top side 312, a bottom side 314, and opposite sides 316. The cover 300 has a "T" shape that substantially matches the "T" the shape of the front-end section 132 of the support substrate 110. The bottom side 314 includes a central flat bottom surface 318. In an alternate embodiment, the bottom side 314 can include fiber grooves 310 (see close-up inset in FIG. 3B) that align with the fiber grooves 210 of the support substrate 110. The "wide" top end of the "T" of the cover 300 is at the rear end 304 and is defined by two wings 306 that each includes an open pin channel 320, so that there are two substantially parallel cover pin channels 320 that run parallel to the cover axis AC. The two cover pin channels 320 are spaced apart with the same spacing as the substrate pin channels 220 of the support substrate 110.

The narrow (bottom) end of the "vertical" side of the "T" of the cover 300 can be thought of as a central protrusion 352 from the wider portion of the cover and that substantially matches the length and width dimensions of the central protrusion 152 of the support substrate 110. This front-end portion of the cover 300 defines a cover end face 362 at the front end 302. Each wing 306 has a front surface 372, which is set back or recessed relative to the cover end face 362. These front surfaces 372 substantially match up with the front-end recessed surfaces 172 of the support substrate 110 when the cover 300 is in its proper position on the support substrate, as explained below. In an example, the cover 300 is made of the same material as the support substrate 110 or alternatively of different materials that have substantially similar coefficients of thermal expansion (CTE). An advantage of such an arrangement is that it reduces or eliminates thermal expansion issues that can arise when using different materials having substantially different CTEs.

FIG. 4A is a partially exploded view of an example FAU connector 100 wherein the support substrate 110 operably supports an array 8 of fibers 10 in the array 200 of fiber grooves 210, and two alignment pins 380 in the respective substrate pin channels 220. The fibers 10 are shown as having an interleaved configuration on the rear-section surface 144 of the support substrate 110 based on two rows of fibers 10, which can be extracted from a fiber ribbon cable 50 (see, e.g., FIG. 5B). A fan-in configuration can also be employed when the fibers 10 are originally separated at the fiber ribbon cable 50 and need to be brought closer together to fit into the fiber grooves 210.

FIG. 4A shows one row of bare glass sections 16 supported in the fiber grooves 210. In other embodiments, there can be multiple rows of bare glass sections 16. For example, there can be four rows of fibers 10 extracted from a fiber ribbon cable 50, with the top two rows interleaved and the bottom two rows interleaved to form the two rows of bare glass sections 16. The bottom row of bare glass sections 16 can be supported in the fiber grooves 210 while the top row of bare glass fiber sections 16 can be supported in the optional fiber grooves 310 formed in the central flat surface 318 of the bottom side 314 of the cover 300 (see close-up inset of FIG. 3B).

Each alignment pin 380 supported by the support substrate 110 has a front-end section 381 that defines a front end 382 of the alignment pin. Each alignment pin also includes an exposed top section 383 opposite an unexposed bottom section of the alignment pin that resides in the pin channel 220. In an example, each alignment pin 380 has a pin central axis AP and the alignment pins are supported in the FAU connector 100 such that the pin central axes are substantially parallel to the substrate central axis AS. In an example, the alignment pins 380 have an axial length LP (see FIG. 4D) in the range from 6 to 12 mm. The alignment pins 380 axially extend (protrude) from the front-end recessed surfaces 172 by an extension distance dE, which in an example is in the range from 2 mm to 6 mm, depending in part on the axial length LP of the alignment pin. In an example, the extension distance dE defines the front-end section 381, and the front-end section can also be called the "extension section."

In an example, the alignment pins 380 do not extend beyond the front end face plane 162P (i.e., the extension distance dE is limited by the front end face plane), or equivalently is limited by the connector end face plane 390P (introduced and discussed below), so that dE≤dF. In one example the front ends 382 of the alignment pins 380 reside substantially at the connector end face plane 390P. In an example, each alignment pin 380 has a diameter DP in the range from 1 mm to 1.5 mm.

The cover 300 resides above the front-end section 132 in anticipation of being placed and secured thereon. The optical fibers 10 are shown as including the coating section 14 and the bare end section (glass section) 16, with the latter residing in the fiber grooves 210. In an example, the fibers 10 can be extracted from a fiber ribbon cable (not shown). The array of fibers 10 is supported at the coating sections 14 of the fibers on the rear-section surface 144 of the rear-end section 134. In the example, two rows of eight fibers each are interleaved adjacent in the rear-end section 134 adjacent the transition region 146 so that the bare glass sections 16 of the sixteen total fibers are supported in respective sixteen fiber grooves 210 in the array 200 of fiber grooves. The fiber end faces 17 reside adjacent to the front end face 162 of the central protrusion 152 of the front-end section 132 of the support substrate 110. A securing material 350 is applied to the bare end sections 16 of the fibers 10 supported in the fiber grooves 210. Example securing materials includes adhesives and epoxies. In an example, the securing material 350 is substantially thermally resistant, i.e., is one that remains substantially unaffected by solder reflow temperatures (e.g., about 260° C.) for relatively short periods of time (e.g., 1 to 2 minutes). An example of such a securing material is Masterbond UV25, available from Master Bond Inc., Hackensack, N.J. In an example, the securing material 350 is ultraviolet (UV) curable.

FIG. 4B is similar to FIG. 4A except that now the cover 300 is in place on the front-end section 132 of the support substrate 110 to form the assembled FAU connector 100. FIG. 4C is a close-up front end view of the FAU connector 100 of the fibers 10 and the fiber grooves 210. FIG. 4D is a top-down view of the FAU connector 100 of FIG. 4B.

When the cover 300 is in place on the support substrate 110, the support substrate end face 162 and the cover end face 362 define a connector end face 390 for the FAU connector 100. The connector end face 390 in turn defines a connector end face plane 390P that in an example resides in an x-y plane. (see FIG. 4B). The fiber grooves 210 define a fiber pitch P1 at the connector end faced 390 (see FIG. 4C). The cover 300 serves to keep the array 8 of fibers 10 in place in the fiber grooves 210 by the central flat bottom surface 318 (or fiber grooves in the cover) pressing on the fibers 10. In addition, the pin channels 320 in the cover 300 engage respective portions of the top sections 381 of the alignment pins 380 that reside in the pin channels 220 of the support substrate. The pin channels 220 and 320 are sized to closely hold the alignment pins 380 when the cover 300 is in place on the support substrate 110. The pin channels 220 and 320 can be rounded or can have an angular cross-sectional shape (see, e.g., FIG. 6). The alignment pins 380 can be conventional metal alignment pins used in other types of connectors (e.g., MPO fiber connectors), or can be standard sized fiber ferrules (as shown in FIG. 4A) or precision formed glass rods (e.g., formed by glass drawing techniques). Example materials for the alignment pins 380 include glass (e.g., silica), silicon, glass, glass-ceramic, and metal. In one example, the alignment pins 380 comprise ferrules used to hold optical fibers. An advantage of using such "optical fiber ferrules" (or simply "fiber ferrules") is that they are readily available and precision made to relatively tight tolerances. In FAU connector embodiments according to this disclosure, the central bore of the fiber ferrules can remain empty.

In an example, once the cover 300 is secured in place on the support substrate 110, a polishing process (e.g., laser processing) can be carried out on the cover end face 362 and support substrate end face 162 so that the fiber end faces 17 and the cover end face 362 and support substrate end face 162 (which as noted above define the connector end face 390) reside substantially in the same plane and with the fiber end faces now polished to optical quality.

FIG. 5A is a side view of an example FAU connector 100 wherein the FAU end face 90 and the front ends 382 of the alignment pins have been processed (e.g., laser polished) to form an angle in the y-z plane. FIG. 5B is a top-down view of an example FAU connector 100 wherein the connector end face 390 and the front ends 382 of the alignment pins 380 have been processed (e.g., laser polished) to form an angle in the x-z plane.

Figure 6:
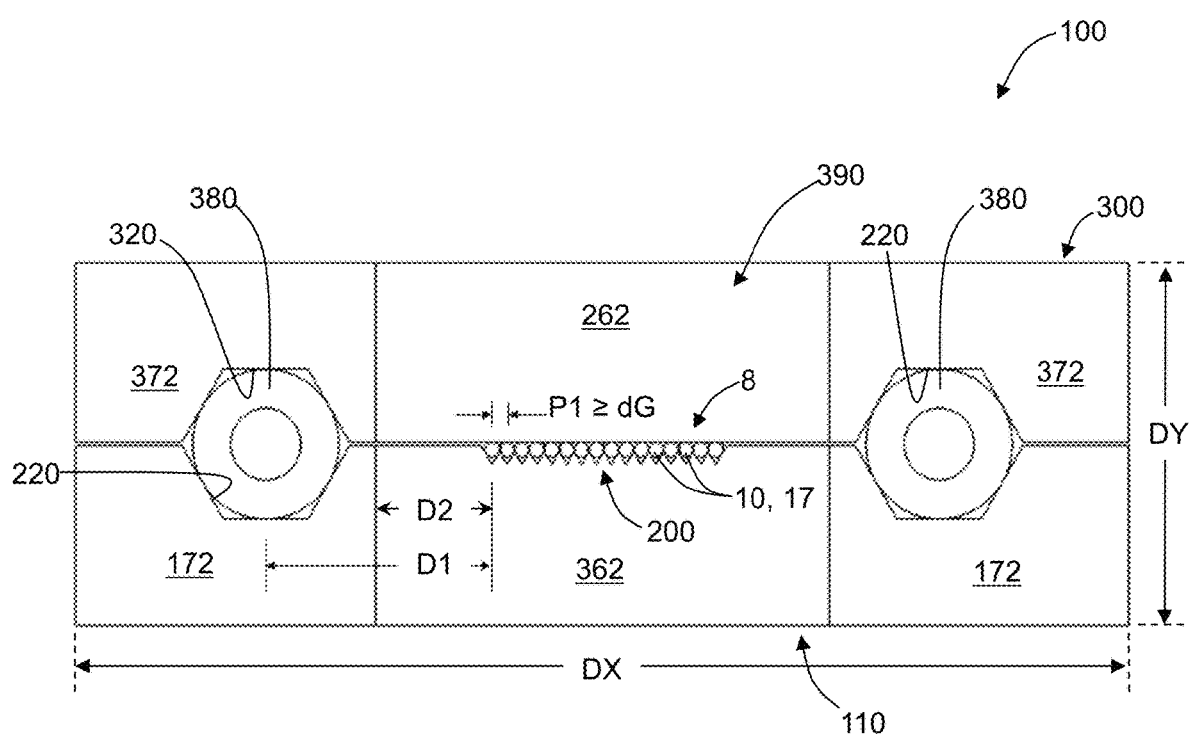
FIG. 6 is a front-end view of the FAU connector of FIGS. 4B-4D illustrating example dimensions, along with an example fiber groove configuration and an example angular configuration for alignment pin channels in the FAU support substrate and the cover.

FIG. 6 is a front-end view of the FAU connector 100 illustrating some example dimensions of the FAU connector and its features. In one example, the distance from the alignment pin central axis AP to the nearest fiber groove 210 is denoted D1 and is in the range from 1.5 mm to 3 mm. The distance from the edge-most fiber groove 210 to the nearest side edge 156 of the central protrusion 152 is D2 and is in the range from 0.25 mm to 1 mm, with 0.5 mm being an example value. The FAU connector 100 has an overall dimension in the y-direction of DY, which in an example is in the range from 2 mm to 5 mm, an overall dimension in the x-direction DX, which in an example is in the range of 6 mm to 35 mm, and an overall dimension in the z-direction of DZ (see FIG. 5B), which in an example is in the range of 5 mm to 15 mm. The DX dimension can be wider or narrower, depending in part on the number of fibers 10 being supported.

FAU Connector Assembly

Figure 7A:
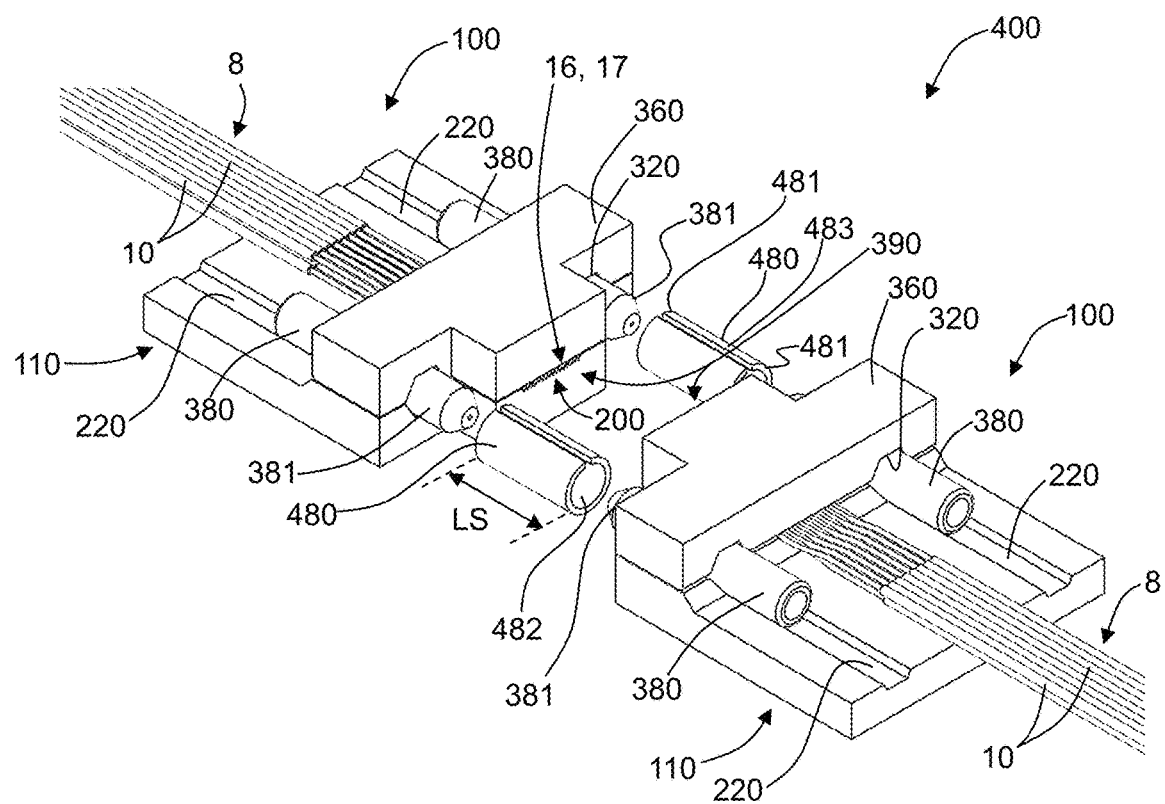
FIG. 7A is an elevated view and FIG. 7B is a top down view showing two opposing but spaced apart FAU connectors in the process of being engaged (interfaced) to form an optical interconnection assembly, wherein alignment sleeves are used to align the opposing alignment pins to establish pin-to-pin alignment of the FAU connectors.
Figure 7B:
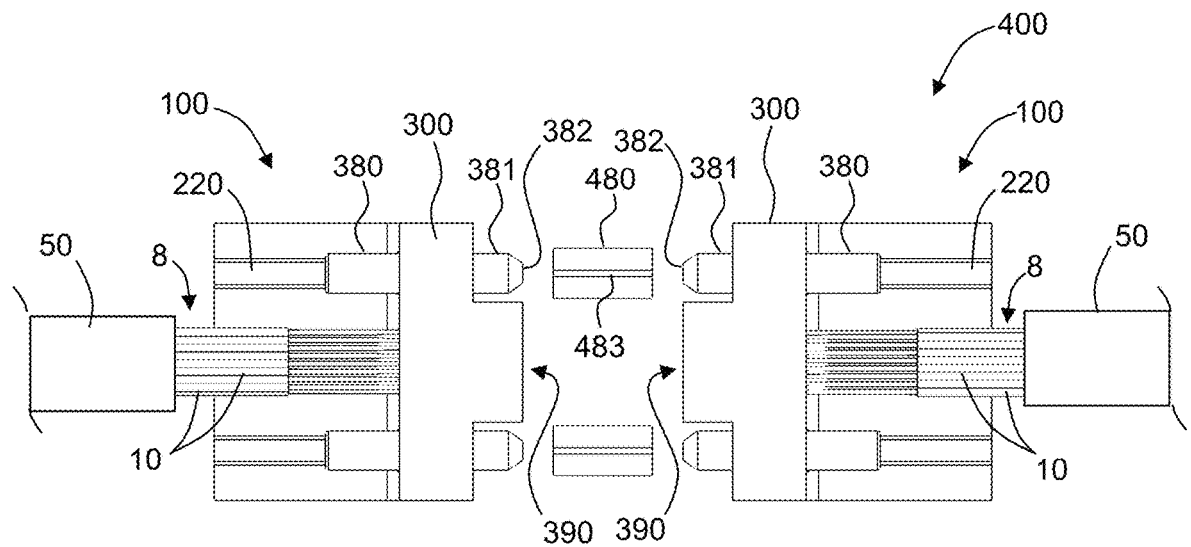

FIG. 7A is an elevated view and FIG. 7B is a top-down view of two FAU connectors 100 shown in a confronting arrangement in anticipation of forming an FAU connector assembly 400. In FIG. 7B, the fibers 10 of each of the FAU connectors 100 are shown as extending from an optical fiber ribbon cable 50. The two FAU connectors 100 are operably engaged (connected) using two tubular alignment sleeves 480 each having an interior 482 and opposite ends 481. The alignment sleeve interior 482 is sized to receive and closely engage the respective front end sections 381 of the confronting alignment pins 380. An example alignment sleeve 480 is a split sleeve that has a slot 483 that defines a "C" cross-sectional shape for the alignment sleeve, which allows for an interference fit between the alignment sleeve and the alignment pins. An example axial length LS of the alignment sleeves is between 3 mm and 5 mm, and depends in part on the extension distance dE of the alignment pins 380.

The two FAU connectors 100 are urged together so that the alignment pins 380 enter the alignment sleeve interior 482 from opposite ends until substantially the entire front-end sections 381 of the alignment pins 380 of each FAU reside within the corresponding alignment sleeve interior. Thus, the substantial alignment between the end faces 17 of the fibers 10 of the two interfaced FAU connectors 100 that form the FAU connector assembly 400 is based on pin-to-pin alignment rather than another type of alignment, such as pin-to-hole alignment. The pin-to-pin alignment obviates the need for a second type of complementary FAU connector, and can employ standard precision-formed slotted alignment sleeves used for other types of connectors.

Figure 7C:
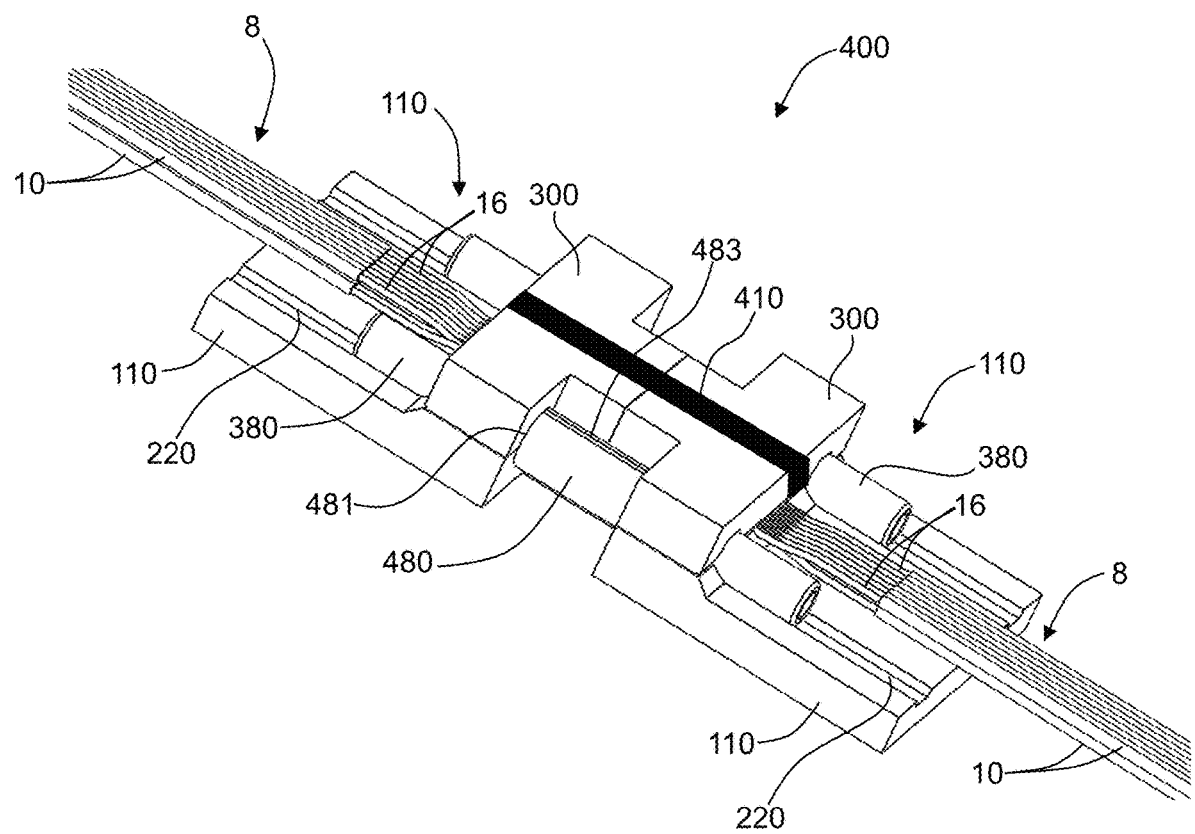
FIG. 7C is an elevated view similar to FIG. 7A, but shows the completed optical interconnection assembly and an optional retaining member.

FIG. 7C is a side elevated view that shows the completed FAU connector assembly 400. In an example, a retaining member 410, such as a clip, can be used to hold the FAU assembly 400 in place, as shown in FIG. 7C. In anticipation of using a retaining member 410, the FAU connectors 100 can each include retaining features, such as recesses or ridges (not shown) to assist in holding the retaining member. The retaining member 410 can have various configurations known in the art, and the simple retaining member 410 shown in FIG. 4C is but one simple example shown for ease of illustration.

Figure 7D:
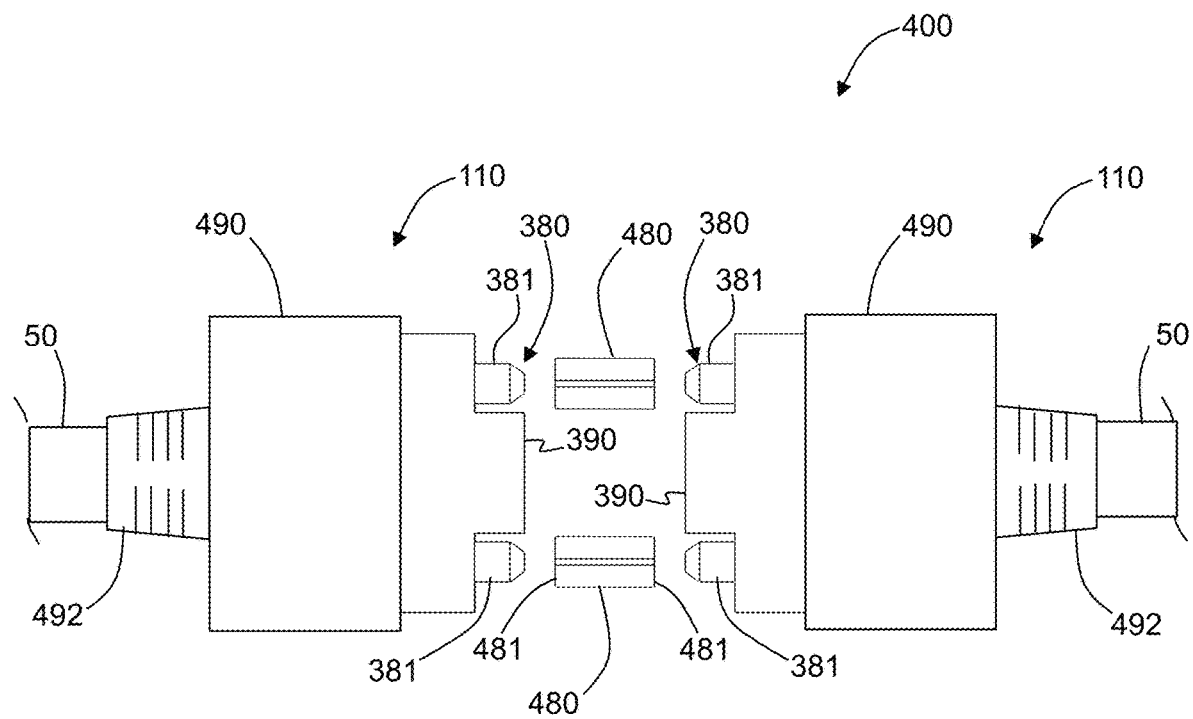
FIG. 7D is similar to FIG. 7C, except that each FAU connector includes a housing that covers an otherwise open back-end portion of the FAU connector.

FIG. 7D is similar to FIG. 7B and shows an example wherein each FAU connector 100 can include a housing 490 that covers the back-end section of the FAU connector where the fibers 10 are otherwise exposed. The housing 490 can also be configured to cover some or all of the cover 300. The housing 490 can also include a boot 492 that engages an end portion of the ribbon cable 50 to help control fiber bending.

Fiber Ribbon Cable Terminated with FAUs

Figure 8:
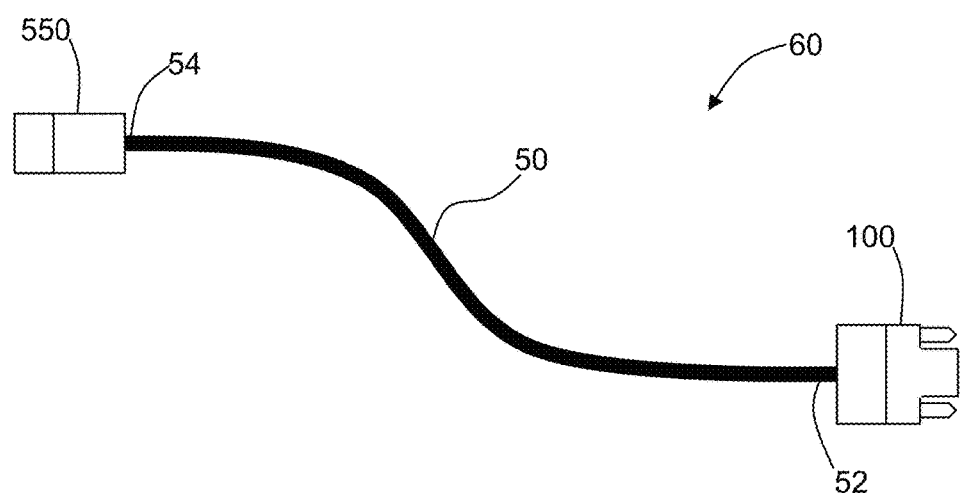
FIG. 8 is a schematic diagram of an example fiber ribbon cable that is terminated at one end by an example FAU connector according to this disclosure and terminated at the opposite end by an example FAU connector that is configured to interface with a photonic integrated circuit (PIC).

FIG. 8 is a schematic diagram of an example ribbon cable assembly 60 that includes the fiber ribbon cable 50, which supports multiple fibers 10, such as sixteen fiber in two rows of eight fibers, or eight fibers in a single row, or ten fibers, etc. The ribbon cable 50 has opposite (first and second) ends 502 and 504. The first end 502 is shown as being terminated by the FAU connector 100 described above. The second end 504 can also be terminated by the same type of FAU connector, or it can be terminated by a different type of FAU connector 550 more suitable to interfacing with a PIC. Such an FAU connector is referred to herein as a "PIC FAU connector" to distinguish from the FAU connector 100. The ribbon cable assembly 60 thus comprises the fiber ribbon cable 50 and the two end connectors, namely the PIC FAU connector 550 and the FAU connector 100.

Figure 9A:
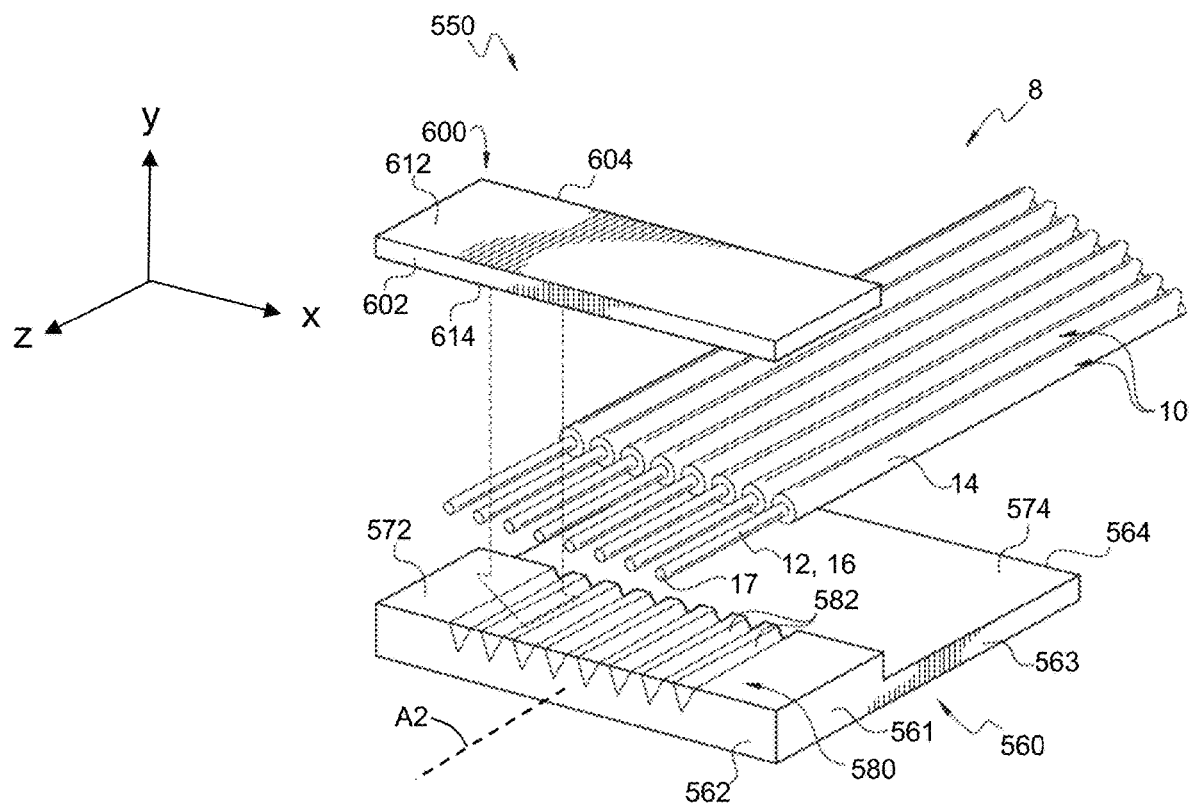
FIG. 9A is an elevated, exploded view
Figure 9B:
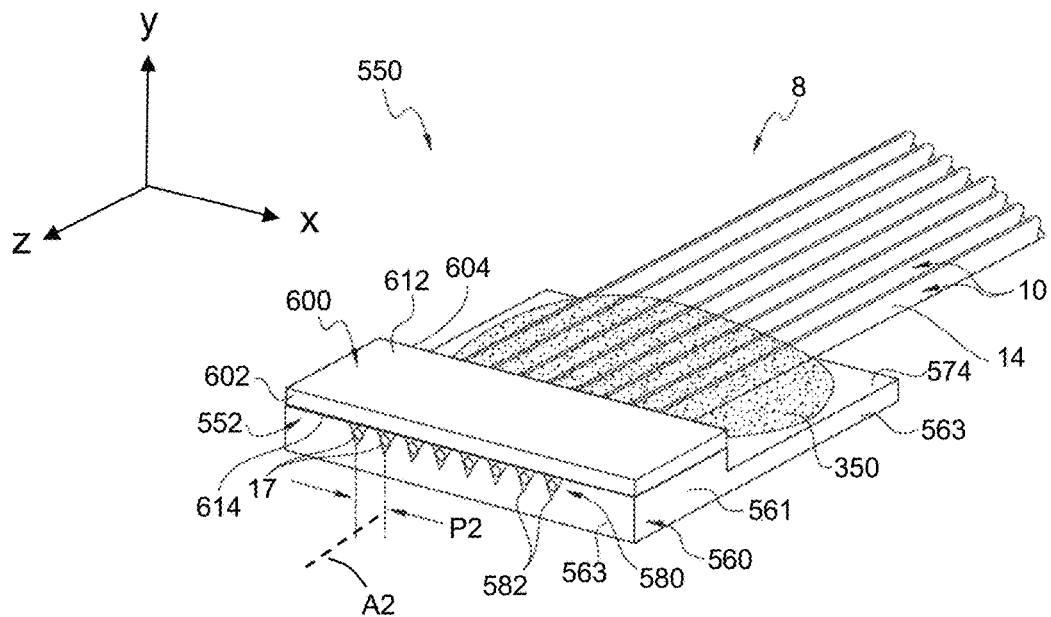
FIG. 9B is an assembled, elevated view of an example FAU connector used to terminate the fiber ribbon cable of FIG. 8.

An example of a PIC FAU connector 550 is shown in FIGS. 9A and 9B, with FIG. 9A being an exploded view for ease of illustration and discussion. The PIC FAU connector 550 includes an FAU support substrate ("support substrate") 560 having a front-end section 561 with a front end 562, a back-end section 563 with a back end 564, and a central axis A2 that runs in the z-direction. The front-end section 561 has a substantially planar top surface 572 while the back-end section 563 has a substantially planar top surface 574. In an example, the top surface 572 of the front-end section 561 is elevated relative to the top surface 574 of the back-end section 563. The front-end section 561 includes an array 580 of fiber grooves 582 formed in the planar top surface 572 and that run parallel to the central axis A2. In an example, the fiber grooves 582 are V-grooves as shown. In an example, the support substrate 560 is made of glass (e.g. silica glass), silicon, ceramic, a glass-ceramic, or combinations thereof.

FIG. 9A shows the fibers 10, which in an example extracted from the fiber ribbon 50 (not shown). Each of the fibers 10 has the aforementioned bare glass section 16 with an end face 17 (see also FIG. 1A). The end section 16 is shown stripped of the protective coating 14 to expose the glass section 12. The fiber grooves 582 of the front-end section 561 of the support substrate 560 are sized to accommodate the bare glass end sections 16 of the fibers 10 while the back-end section 563 accommodates the coating sections 14 of the fibers. Once the end sections 16 of the fibers 10 are supported in the fiber grooves 582, then an securing material 350 can be applied to the fibers at the back-end section 536, as shown in FIG. 9B. A cover 600 having a front end 602, a back end 604, a top surface 612, and a bottom surface 614 is then placed over the top of the array 580 of the fiber grooves 582 to secure the end sections 16 of the fibers 10 in the front-end section 561 of the support substrate 560. The cover 600 is held in place by the securing material 350 contacting the back end 604 of the cover. The securing material 350 can also be added to the fiber grooves 582. In an example, the cover 600 is made of glass, such as silica glass, and further in an example is made of the same material as the support substrate 560.

FIG. 9B shows the resulting PIC FAU connector 550, with the end faces 17 of the fibers 10 residing adjacent to the front end 562 of the support substrate 560. The PIC FAU connector 550 supports the fibers 10 at a pitch P2 at the end face 552, wherein the pitch P2 can be different than the pitch P1 at the end face 390 of the FAU connector 100.

PIC Assembly, PIC Module and Fiber Ribbon Cable with FAU-Based Connectors

Figure 10A:
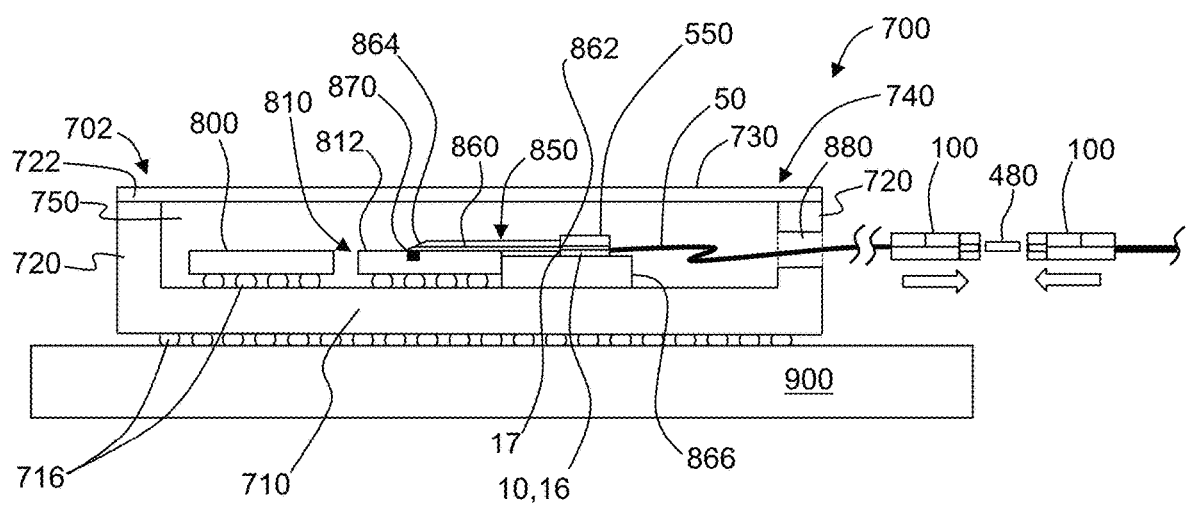
FIG. 10A is a schematic diagram of a PIC assembly that includes a PIC module, illustrating how a fiber ribbon cable can be connected to the PIC module using FAU connector of FIGS. 9A and 9B while the other end of the fiber ribbon cable is terminated with an FAU connector according to this disclosure and available for connecting to another FAU connector or to another optical device.

FIG. 10A is a schematic diagram of an example of a PIC assembly 700 that includes a PIC module 702. The PIC module 702 includes a PIC substrate 710, walls 720 that extend upward from the PIC substrate 710 and that have tops 722, and a cover 730 supported at the tops 722 of the walls 720. The PIC substrate 710, the walls 720, and the cover 730 define a PIC module housing 740 having a PIC module interior 750. The PIC substrate 710 has a surface 712 that includes electrical contacts 714. The example PIC module 702 includes in the PIC module interior 750 an electronic chip 800 and an optical-electrical (O-E) chip 810, each supported by the PIC substrate 710 on the surface 712 using solder balls 716 disposed on the electrical contacts (not shown). The O-E chip 810 has a top surface 812.

The PIC substrate 710 also includes electrical interconnections (e.g., wiring, not shown) so that the electronic chip 800 and O-E chip 810 are in electrical communication with one another. The O-E chip 810 is used to convert optical signals to electrical signals and vice versa. The electronics chip 800 and the O-E chip 810 communicate via electrical signals. The PIC module 702 also includes in the PIC module interior 750 a planar lightwave circuit (PLC) 850 that resides on the top surface 812 of the O-E chip 810. The PLC 850 operably supports an array of optical waveguides 860 each having a first (distal) end 862 and a total-internal-reflection (TIR) beveled second (proximal) end 864 adjacent the O-E chip top surface 812 and that is optically coupled to a corresponding optical component 870 supported by the O-E chip 810. The optical component 820 can be for example an optical transmitter (e.g., laser source) or an optical receiver (e.g., photodetector) or to an optical transceiver (combination of optical transmitter and optical receiver). An optional support base 866 can be used to support the PIC FAU 550 to facilitate optical alignment between the fibers 10 of the PIC FAU and the optical waveguides 860 of the PLC 850. In an example, the support base can be used to support an end portion of the PLC 850.

Figure 10B:
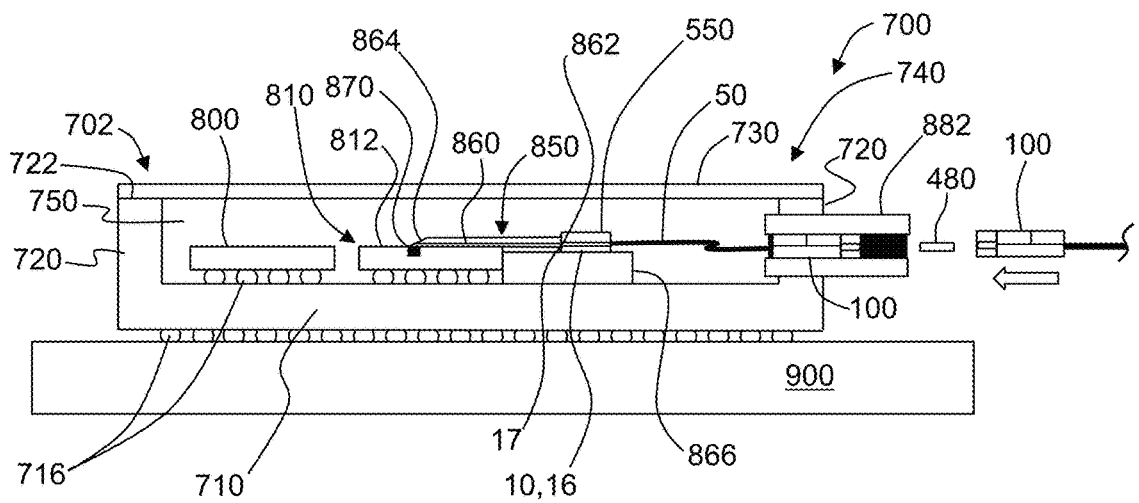
FIG. 10B is similar to FIG. 10A, except that it shows the FAU connector according to this disclosure supported by a connector module in a wall of the PIC module.

The fibers 10 of the PIC FAU connector 510 of the ribbon cable 50 are optical coupled via their corresponding end faces 17 to the first (distal) ends 862 of the optical waveguides 860 of the PLC 850. The FAU connector 100 at the opposite end is available to be connected to another FAU connector 100, such as shown in FIG. 7C. FIG. 10A shows the ribbon cable 50 passing through an aperture 880 in the right-hand-side wall 720 and the FAU connector 100 residing outside of the PIC module interior 750 and having a range of motion based on the amount of slack in the ribbon cable 50. FIG. 10B shows an alternate embodiment wherein the FAU connector 100 is operably supported by a connector adapter 882 configured to receive another FAU connector 100 to form an FAU connector assembly 400 as described above.

The FAU connector 100 of the ribbon cable 50 can thus be used to facilitate optical communication of optical signals (e.g., optical data signals) to and from the PIC module. In the example PIC assembly 700, the PIC module 702 is in electrical communication with an electrical circuit (electronics) module 900 via the electronics chip 800 and additional solder balls 716 operably disposed between electrical contacts (not shown) of the PIC module and the electronics module.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A fiber-array-unit (FAU) connector configured for pin-to-pin alignment, comprising:
 an array of optical fibers, with each optical fiber of the array of optical fibers having a coated section and a bare glass section that includes a fiber end face;

a support substrate supporting the array of optical fibers, the support substrate having a substrate central axis, a rear-end section, and a front-end section that is elevated relative to the rear-end section, wherein:
- the front-end section includes a front end face that resides in a front end face plane, front-end recessed surfaces that are axially spaced apart from the front end face, and a top surface with fiber grooves that are substantially parallel to the substrate central axis and that respectively support the bare glass sections of the optical fibers so that the fiber end faces reside adjacent to the front end face,
- the front-end section further includes first and second alignment pin channels that run substantially parallel to the substrate central axis, that reside on opposite sides of the fiber grooves, and that terminate at a respective one of the front-end recessed surfaces, and
- the rear-end section supports the coated sections of the optical fibers;

first and second alignment pins respectively supported in the first and second alignment pin channels, with each of the first and second alignment pins axially extending from their respective first or second alignment pin channels by an extension distance dE; and a cover secured to the front-end section to hold the bare glass sections and the first and second alignment pins in place.

2. The FAU connector according to claim 1, wherein the support substrate comprises a monolithic body made of a single material.

3. The FAU connector according to claim 2, wherein the single material comprises one or more of the following: a glass, silicon, a ceramic, or a glass ceramic.

4. The FAU connector according to claim 1, wherein the support substrate and the cover are made of the same material.

5. The FAU connector according to claim 4, wherein the same material comprises silica glass.

6. The FAU connector according to claim 1, wherein the first and second alignment pins include exposed top sections and the cover comprises first and second cover alignment pin channels that closely receive respective portions of the exposed top sections of the first and second alignment pins.

7. The FAU connector according to claim 1, wherein the cover is secured to the front-end section of the support substrate using a securing material.

8. The FAU connector according to claim 1, wherein the bare glass sections of the optical fibers have a diameter dG in the range from 40 microns to 80 microns.

9. The FAU connector according to claim 1, wherein the first and second alignment pins comprise one or more of the following: a metal, a glass, silicon, a ceramic, or a glass ceramic.

10. The FAU connector according to claim 1, wherein the first and second alignment pins comprise optical fiber ferrules.

11. The FAU connector according to claim 1, wherein the fiber grooves comprise V-grooves.

12. The FAU connector according to claim 1, further comprising a housing that encloses at least the rear-end section of the support substrate and the optical fibers supported thereon.

13. The FAU connector according to claim 1, wherein the optical fibers have either an interleaved configuration or a fan-in configuration at the rear-end section of the support substrate.

14. An FAU connector assembly employing pin-to-pin alignment, comprising:
first and second FAU connectors each comprising:
an array of optical fibers, with each optical fiber of the array of optical fibers having a coated section and a bare glass section that includes a fiber end face;
a support substrate supporting the array of optical fibers, the support substrate having a substrate central axis, a rear-end section, and a front-end section that is elevated relative to the rear-end section, wherein:
- the front-end section includes a front end face that resides in a front end face plane, front-end recessed surfaces that are axially spaced apart from the front end face, and a top surface with fiber grooves that are substantially parallel to the substrate central axis and that respectively support the bare glass sections of the optical fibers so that the fiber end faces reside adjacent to the front end face,
- the front-end section further includes first and second alignment pin channels that run substantially parallel to the substrate central axis, that reside on opposite sides of the fiber grooves, and that terminate at a respective one of the front-end recessed surfaces, and
- the rear-end section supports the coated sections of the optical fibers;

first and second alignment pins respectively supported in the first and second alignment pin channels, with each of the first and second alignment pins axially extending from their respective first or second alignment pin channels by an extension distance dE, and with each of the first and second alignment pins having a front-end section with a front end; and a cover secured to the front-end section to hold the bare glass sections and the first and second alignment pins in place; and first and second alignment sleeves each having first and second opposite ends and an interior;

wherein the front-end sections of the first and second alignment pins of the first and second FAU connectors respectively reside in the interiors of the first and second alignment sleeves so that the front ends of the first alignment pins are confronting in the first alignment sleeve and the front ends of the second alignment pins are confronting in the second alignment sleeve, thereby placing the end faces of the optical fibers of the first and second FAU connectors in optical alignment.

15. The FAU connector assembly according to claim 14, wherein the front ends of the first and second alignment pins reside in a plane defined by the front end face of the support substrate.

16. The FAU connector assembly according to claim 14, wherein the first and second alignment sleeves are slotted and sized to provide either a close fit or an interference fit with the first and second alignment pins of the first and second FAU connectors.

17. The FAU connector assembly according to claim 14, further comprising a retaining member configured to hold the first and second FAU connectors together.

18. An optical assembly, comprising:
the FAU connector of claim 1;
a fiber ribbon cable having a first cable end terminated by the FAU connector, wherein the fiber ribbon cable carries the optical fibers of the FAU connector and has a second cable end opposite the first cable end; and
a photonic integrated circuit (PIC) FAU connecter that terminates the second cable end; and a PIC module optically connected to the PIC FAU connector.

19. The optical assembly according to claim 18, wherein the PIC module comprises an optical-electrical (O-E) chip that includes at least one optical device and optical waveguides in optical communication with the at least one optical device, and wherein the PIC FAU connector places the optical fibers of the fiber ribbon cable in optical communication with the the optical waveguides of the O-E chip.

20. A fiber-array-unit (FAU) connector, comprising:
an array of optical fibers, with each optical fiber of the array of optical fibers having a coated section and a bare glass section that includes a fiber end face;
a support substrate supporting the array of optical fibers and having a monolithic substrate body with a substrate central axis, the support substrate including: i) a rear-end section that defines a rear end and a rear-end top surface, and ii) a front-end section that defines a front end face, first and second front-end recessed surfaces axially spaced apart from the front end face, and a front-end top surface elevated relative to the rear-end top surface, wherein:
the front-end section includes a central protrusion that extends in the direction of the substrate central axis,
the first and second front-end recessed surfaces are axially separated from the front end face by a protrusion distance dF,
the front-end top surface includes fiber grooves, and
the coated sections of the optical fibers are supported on the rear-end top surface and the bare glass sections are supported in the fiber grooves in the front-end top surface such that the fiber end faces reside adjacent to the front end face;
first and second alignment pin channels each formed in the front-end top surface and the rear-end top surface, wherein the first and second alignment pin channels run substantially parallel to the substrate central axis on opposites sides thereof and have open ends at the respective first and second front-end recessed surfaces;
first and second alignment pins respectively disposed in the first and second alignment pin channels, wherein each of the first and second alignment pins includes a front-end section that extends past the respective first or second front-end recessed surface by an extension distance dE that is less than the protrusion distance dF; and
a cover secured to the front-end section of the support substrate, the cover having a front end, a bottom surface, and cover alignment pin channels in the bottom surface, wherein the cover is disposed on the front-end section such that the bottom surface resides on the bare glass sections of the optical fibers, the cover alignment pin channels receive and engage portions of the first and second alignment pins, and the cover end face resides adjacent to the front end face of the support substrate.

* * * * *

UNITED STATES PATENT AND TRADEMARK OFFICE
CERTIFICATE OF CORRECTION

PATENT NO. : 10,942,316 B1
APPLICATION NO. : 16/669746
DATED : March 9, 2021
INVENTOR(S) : Ximao Feng et al.

Page 1 of 1

It is certified that error appears in the above-identified patent and that said Letters Patent is hereby corrected as shown below:

In the Claims

In Column 13, Line 53, Claim 9, delete "silicon," and insert -- a silicon, --, therefor.

In Column 15, Line 9, Claim 19, after "with the" delete "the".

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*